Sept. 10, 1968        D. F. LACKEY ET AL            3,401,280
       FABRICATED SQUIRREL CAGE ROTOR CONSTRUCTION FOR ELECTRIC
              MOTOR AND METHOD OF ASSEMBLING THE SAME
Filed March 1, 1966                               2 Sheets-Sheet 1
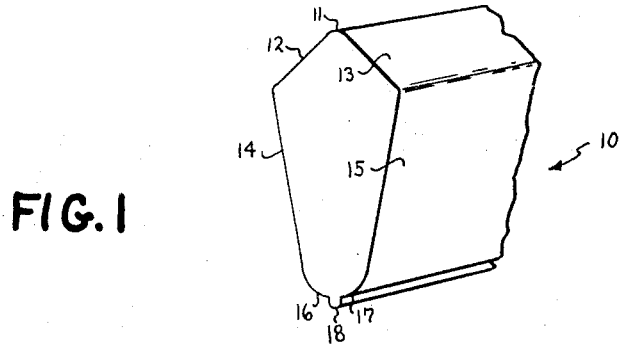
FIG. 1
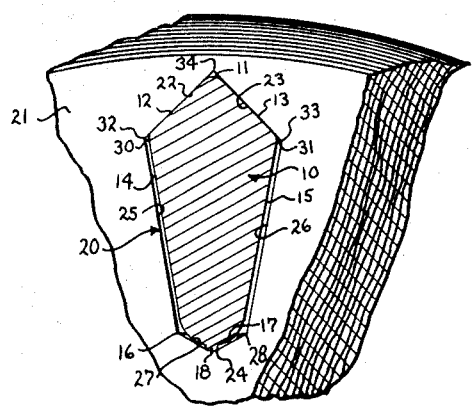
FIG. 2
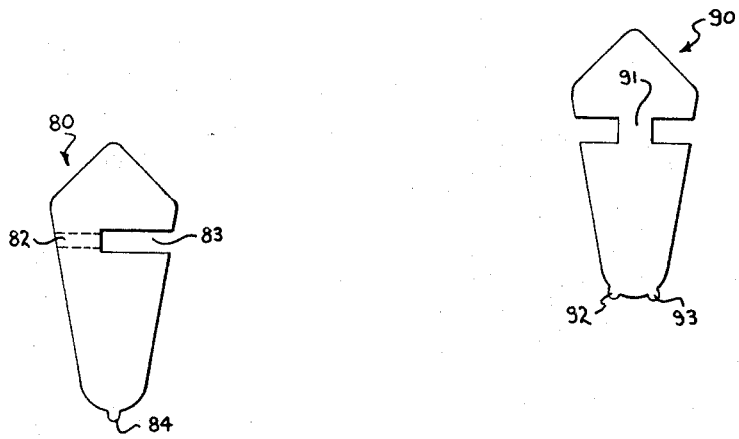
FIG. 4
FIG. 5
INVENTORS
DALE F. LACKEY
GILBERT D. SPOONER
BY
THEIR ATTORNEY

INVENTORS
DALE F. LACKEY
GILBERT D. SPOONER

THEIR ATTORNEY

United States Patent Office 3,401,280
Patented Sept. 10, 1968

3,401,280
FABRICATED SQUIRREL CAGE ROTOR CONSTRUCTION FOR ELECTRIC MOTOR AND METHOD OF ASSEMBLING THE SAME
Dale F. Lackey, Saratoga, and Gilbert D. Spooner, Schenectady, N.Y., assignors to General Electric Company, a corporation of New York
Filed Mar. 1, 1966, Ser. No. 530,908
8 Claims. (Cl. 310—42)

This invention pertains generally to conductive windings in dynamoelectric machines and, more specifically, relates to fabricated squirrel cage windings for electric induction motor rotors.

Many induction motor rotors, and particularly those adapted for use in large size machines, feature a squirrel cage winding of the fabricated kind. With the fabricated winding, preformed conductor bars are inserted in slots provided through the rotor core and thereafter conductive end rings are welded, or otherwise suitably electrically and mechanically interconnected, to extensions of the bars at opposite ends of the core. The result is the well-known winding structure from which the descriptive name squirrel cage is derived. The fabricated construction of present concern is to be distinguished from the integral cast construction most commonly used in small size rotors.

When conductor bars are extruded in an economical process of manufacture, as opposed to being formed by precision machining, or the like, the dimensions thereof vary a substantial amount and in a random manner from one bar to another bar. When a plurality of laminations having circumferentially spaced holes punched therein are stacked in aligned relationship to provide a rotor core, the dimensions of the axially extending slots provided through the core are not uniform and the edges thereof are ragged and uneven. In view of the foregoing, it will be appreciated that experience shows a sizeable proportion of bars will be unacceptably loose in the slots, whereas another sizeable proportion of bars cannot be inserted into the slots, at least not without being reformed. Present practice is to broach or otherwise smooth and uniformly dimension the slots, or to provide bars of closely held tolerances, and oftentimes both are required for satisfactory construction. However, it would be advantageous if economical extruded stock could be used in the form supplied for conductor bars. Also, it would be desirable to obviate broaching or otherwise machining the rotor slots after stacking.

Accordingly, an object of this invention is to provide a conductor bar capable of snugly fitting into the rotor slot without requiring close tolerances for either the bar or the slot.

Another object of this invention is to provide an improved and more economically fabricated squirrel cage rotor.

Briefly, the foregoing objects and others that will become apparent are achieved in accord with one aspect of the present invention by providing a conductor bar having at least one integral projection of relatively small cross-section area located preferably at the bottom, or radially inward, portion of the bar. When the bar is forcibly inserted into the slot, a portion of the small projection is sheared off by the bottom of the slot in whatever quantity is required to provide a close mechanical fit. In a preferred embodiment a receptacle for shavings from the projection is provided in the end ring through which the bar is inserted and the bar is fabricated of aluminum.

While the specification concludes with claims particularly pointing out and distinctly claiming the subject matter of this invention, the following detailed description of the invention, taken in conjunction with the accompanying drawings, should be referred to for a better understanding of the invention.

FIG. 1 is a cross-section view of a conductor bar in accord with the invention;

FIG. 2 is a partial cross-section view of the bar of FIG. 1 positioned in a rotor slot;

FIG. 4 is a cross-section view of an alternative conductor bar in accord with the invention; and FIG. 5 is a cross-section view of a conductor bar illustrating an alternative embodiment of the invention.

Figure 3:
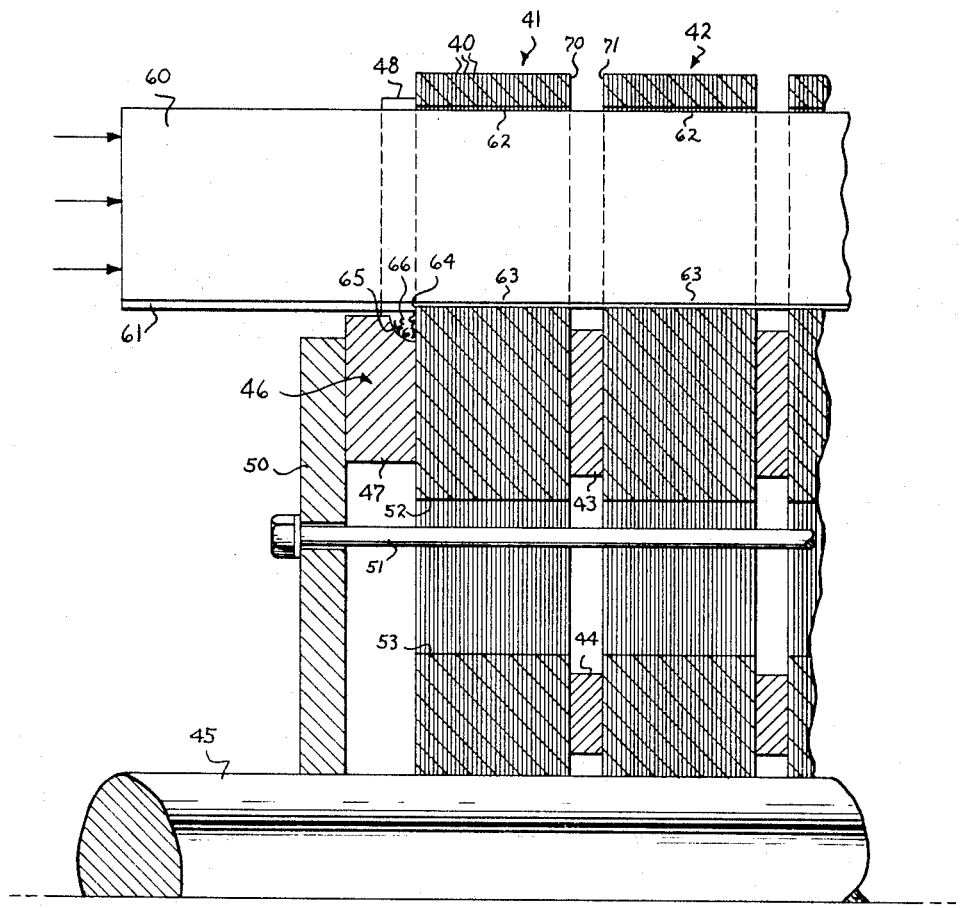
FIG. 3 is a partial side view in cross section of a rotor in accord with a preferred embodiment of the invention.

Top or bottom as used herein and in the appended claims in reference to slots or conductors is used in the conventional sense to designate the portion disposed closest to or most remote from, respectively, the air gap of the machine. Accordingly, in the case of a rotor, which is the setting for the illustrative embodiment of the invention, the top of a slot or conductor is the radially outer portion thereof. Conversely, the bottom of a slot or conductor is the radially inner portion thereof.

As illustrated in FIG. 1, an elongated conductor bar, generally indicated by numeral 10, has a substantially V-, or wedge-shaped top portion with an apex 11 and top surfaces 12 and 13 extending outwardly and downwardly therefrom to define support planes adapted to engage complementary surfaces at the top of a corresponding slot in a manner and for purposes to be described presently. The sides 14 and 15 of bar 10 extend from the opposing extremities of surfaces 12 and 13, respectively, to the bottom surfaces 16 and 17, respectively. Sides 14 and 15 advantageously converge slightly in the direction of the bottom of bar 10, as shown, so that the bar is advantageously dimensioned for obtaining maximum bar section within the available space, for example, among other well-known considerations.

In accord with this invention, there is provided an elongated integral projection 18 on bar 10 extending radially inwardly from the bottom surface thereof. In the illustrative embodiment of FIG. 1, projection 18 is disposed symmetrically relative to bottom surfaces 16 and 17. Projection 18 is a sacrifice piece, that is to say, a portion of projection 18 is shaved, or sheared, off by the corresponding edge of the slot into which it is inserted. In this way, bar 10 is custom-fitted to the slot. In order not to require excessive insertion force to effect the accompanying removal of material from projection 18, the cross-sectional area of projection 18 is advantageously relatively small, depending to some extent upon the material of the bar and that in which the slot is formed, and particularly the relative hardnesses of the two materials. In general, it is desirable, in view of the foregoing considerations, to provide a thickness, or transverse dimension, for the projection 18 that is as small as is consistent with reliable mechanical support for the bar 10 within the associated slot.

FIG. 2 is a cross-section view of a bar 10, as described in conjunction with FIG. 1, after insertion into a slot, generally indicated at 20 and provided by a series of aligned apertures in stacked laminations, as lamination 21. In the case of a dynamoelectric machine, it will be understood that lamination 21 is fabricated of relatively hard magnetic iron of the kind customarily employed in the cores of such devices. Also, while only a single slot 20 and conductor 10 are shown, there are a plurality of similar slots and conductors circumferentially spaced about the periphery of a rotor core, for example.

In the preferred construction of FIG. 2, a three-point suspension of conductor 10 is provided within slot 20. Top surfaces 12 and 13 of conductor 10 bear against complementary-shaped top surfaces 22 and 23, respectively, of slot 20 and projection 18 at the bottom of conductor 10 bears against the corresponding bottom surface 24 of slot 20. The bottommost tip of projection 18 has been sheared off by the initial portion of bottom surface 24 during insertion of conductor 10 into slot 20, in order to provide an adapted tight fit. Side surfaces 14 and 15 advantageously only lightly bear against the corresponding side surfaces 25 and 26, respectively, of slot 20 and preferably are spaced therefrom throughout most or all of the axial length of the slot 20. A similar relationship desirably exists between bottom surfaces 16 and 17 of conductor 10 and the corresponding bottom side surfaces 27 and 28, respectively, of slot 20.

In operation, there are large electromagnetic and mechanical forces acting upon conductor 20, and in particular the centrifugal force is oftentimes high. To minimize local stress concentrations that can cause yielding or fracturing of the usual materials employed for conductor bars, as copper alloys and aluminum alloys, for example, the corners of the conductor are advantageously not used as principal bearing surfaces. Toward this end, the top shoulders 30 and 31 and apex 11 are conveniently spaced from the corresponding complementary-shaped corners 32, 33 and 34, respectively, of slot 20. By spaced, as used herein and in the appended claims, it is intended to refer to the absence of a tight metal-to-metal engagement of the so-designated portions of conductor 10 and slot 20, even though an actual void is not present because of a relatively compressible resinous impregnant, or the like, filling any interstices between the members.

The centrifugal forces on bar 10, as illustrated in FIG. 2, are borne by top surfaces 12 and 13 thereof, while the wedge shape also more effectively adapts these surfaces to provide restraint against relative movement in the slot when subjected to circumferentially directed forces. In one particularly desirable embodiment of the invention, the lesser included angle between top surfaces 12 and 13 was made equal to approximately 90 degrees.

A manner of conveniently practicing the invention to provide a dynamoelectric machine rotor is illustrated in FIG. 3. A rotor core is fabricated of a plurality of annular stacked laminations 40, of ferromagnetic material, that can be assembled in groups 41 and 42 separated by space blocks, as blocks 43 and 44, to provide efficient cooling. The laminations 40 each include a plurality of circumferentially spaced apertures that are substantially axially aligned to provide corresponding slots through the core. The core is conveniently supported by a central mandrel, spider or a rotor shaft 45, as illustrated. End rings of electrically conductive material are positioned against the laminations at either end of the core, one of which, end ring 46, is shown. End ring 46 comprises an annular main body portion 47 having an outer peripheral surface extending radially outwardly approximately the same distance as the bottom of the slots and carrying a plurality of integral spokes, or radially outwardly projecting fingers 48 which overly and generally conform to the shape of the laminations between the conductor slots. An annular pressure plate 50 bears against the axially outer surface of the annular portion of end ring 46 to temporarily provide compression of the stack. Pressure plate 50 is conveniently biased toward a corresponding member (not shown) at the other end of the stack by means of tension bolts, as bolt 51, passing through axial ventilation openings in the core and depicted by dashed lines 52 and 53.

In accord with the present invention there is provided a conductor bar 60 having at least one integral projection 61 thereon and otherwise being complementary-shaped to the slot configuration, i.e., the conductor bar 60 is adapted to be received in the axially extending rotor slot depicted by dashed lines 62 and 63. The bar and slot can be as previously described in conjunction with FIGS. 1 and 2.

Bar 60 is forcibly inserted into the rotor slot, as by hand or with pneumatic hammers or the like, and concomitantly a portion of projection 61 is shaved to size, principally by the leading edge 64 of the axially outwardmost lamination of the stack. A receptacle 65 for collecting shavings is conveniently provided in the radially outer edge of the annular portion 47 of end ring 46 adjacent the laminated core. Receptacle 65 is advantageously provided by an annular groove in ring 46, but can also be plurality of individual receptacles formed adjacent the bottom of each slot and/or cutaway portions of the end laminations. In the absence of some kind of receptacle, it has been found that the shavings build up and unduly restrict insertion of bar 60.

In the preferred construction wherein spacer blocks are not disposed intermediate the conductor slots, it is desirable to provide a temporary spacer between surfaces 70 and 71 to prevent delamination of the outer peripheral portion of the stack during insertion of bar 60. Hardwood wedges are acceptable as spacers for this purpose, for example.

After bar 60 and the other conductor bars for the rotor are inserted in the slots with convenient extensions projecting axially coextensive with fingers 48, the bars and end rings are electrically and mechanically joined, preferably by welding, or by brazing, soldering or the like. Tension bolt 51 and pressure plate 50 are no longer required thereafter and can be removed, leaving the joined end rings and conductor bars to provide the axial compression of the stack. The rotor structure is completed in most cases by dipping in a liquid resinous material and baking to cure.

Aluminum, including aluminum alloys, provides the preferred material for the end rings and conductor bars because aluminum is a good conductor of electricity and is more readily shaped in accord with the invention than is copper, for example, although both are readily workable materials. It has been found, by way of specific example, that total deviations in the radial height of aluminum conductors of approximately 1% can be readily accommodated in accord with this invention. Bars of two-inch height, within plus or minus one hundredths of an inch, having a radial bottom projection (see FIG. 1) extending two hundredths of an inch are satisfactory. It will be appreciated by those skilled in the art that extrusion of a suitable conductor bar blank of such tolerances is well within the capabilities of current practice.

FIG. 4 illustrates a conductor bar 80 having axially spaced apertures 82 therethrough opening into a deep longitudinal slot 83 therein. An integral projection 84 is provided on the bottom of bar 80 in accord with the present invention. The T-shaped bar 90, illustrated in FIG. 5 has a narrowed central neck portion 91 and features two integral projections 92 and 93 symmetrically disposed at the bottom of bar 90. Two or more projections can be used advantageously in accord with the invention on other bar constructions and generally permits more twist of the bar blank to be accommodated, while requiring a greater driving force in most cases. Projections 92 and 93 preferably engage the side and bottom surfaces of the slot at their intersection.

According to the provisions of the patent statutes, we have explained the principal of our invention and have illustrated and described what we now consider to represent its best embodiment. However, we desire to have it understood that, within the scope of the appended claims, the invention may be practiced otherwise than as specifically illustrated and disclosed.

What we claim as new and desire to secure by Letters Patent of the United States is:

1. The method of securely assembling an elongated bar of readily workable conductive material in a dynamoelectric machine slot adapted to reecive the bar and formed in relatively harder material, said method comprising:
(a) providing a bar having at least one integral shear projection along the length of the bar; and
(b) forcibly inserting the bar in the slot and concomitantly shaving off a portion of said projection with the corresponding surface of the slot.

2. The method of claim 1 wherein said bar is fabricated of aluminum.

3. The method of claim 2 wherein said slot is in a laminated core of ferromagnetic punchings.

4. The method of fabricating a squirrel cage rotor for an electric induction motor including the steps of:
(a) compressing a stack of rotor laminations by means including conductive end rings at either end of the stack, said laminations having a plurality of circumferentially spaced aligned apertures providing axially extending slots;
(b) providing elongated conductive bars having shear projections thereon and being otherwise adapted to fit loosely into said slots;
(c) forcibly inserting said conductors into corresponding ones of said slots and concomitantly shaving off a portion of said projections with the edges of said slots; and
(d) electrically and mechanically interconnecting said bars and end rings at respective ends of said stack.

5. The method of claim 4 wherein said bars are extruded aluminum.

6. The method of claim 4 including the step of collecting shavings from said projections in a receptacle formed in one of said end rings.

7. The method of claim 4 wherein said stack comprises axially spaced groups of laminations and including the step of restraining relative axial movement of the laminations by means of spacers disposed between the groups and adjacent the slots.

8. A rotor for an electric induction motor comprising: a laminated stack of annular ferromagnetic punchings providing a core having axially extending slots circumferentially spaced in the periphery thereof and respective conductors in said slots each having a wedge-shaped top portion with angled surfaces abutting corresponding surfaces of the core at the top of the slot and an integral projection at the bottom of each conductor abutting the core at the bottom of the slot.

References Cited
UNITED STATES PATENTS

| | | | |
|---|---|---|---|
| 1,647,633 | 11/1927 | Johnson | 310—212 |
| 2,060,859 | 11/1936 | Flynt | 174—133 X |
| 2,121,655 | 6/1938 | Elsey et al. | 29—598 X |
| 2,504,825 | 4/1950 | Meyer et al. | 310—211 |
| 2,873,515 | 2/1959 | Winstrom | 29—205 |
| 2,944,171 | 7/1960 | Alger | 310—211 |

MILTON O. HIRSHFIELD, *Primary Examiner.*

WARREN E. RAY, *Assistant Examiner.*